(12) United States Patent
Garrison et al.

(10) Patent No.: US 10,405,659 B2
(45) Date of Patent: Sep. 10, 2019

(54) FOLDING CHAIR ARMREST WITH ACOUSTIC ENHANCING CELL PHONE HOLDER

(71) Applicant: Rio Brands, LLC, W. Conshohocken, PA (US)

(72) Inventors: Scott Garrison, Fitchburg, WI (US); Kalman Fang, Taizhou (CN)

(73) Assignee: Rio Brands, LLC, West Conshocken, PA (US)

( * ) Notice: Subject to any disclaimer, the term of this patent is extended or adjusted under 35 U.S.C. 154(b) by 43 days.

(21) Appl. No.: 15/813,154

(22) Filed: Nov. 15, 2017

(65) Prior Publication Data
US 2019/0142163 A1    May 16, 2019

(51) Int. Cl.
| | | |
|---|---|---|
| *A47C 1/03* | (2006.01) | |
| *A47C 4/28* | (2006.01) | |
| *H04M 1/11* | (2006.01) | |
| *A47C 7/72* | (2006.01) | |
| *H04M 1/04* | (2006.01) | |
| *A47C 7/54* | (2006.01) | |
| *A47C 7/62* | (2006.01) | |

(52) U.S. Cl.
CPC ............... *A47C 1/03* (2013.01); *A47C 4/286* (2013.01); *A47C 7/54* (2013.01); *A47C 7/624* (2018.08); *A47C 7/72* (2013.01); *H04M 1/04* (2013.01); *H04M 1/11* (2013.01); *A47C 7/62* (2013.01)

(58) Field of Classification Search
CPC .. A47C 1/03; A47C 4/286; A47C 4/28; A47C 4/32; A47C 4/34; A47C 7/62; A47C 7/72; A47C 7/622; A47C 7/624; H04M 1/04; H04M 1/11; H04M 1/14
USPC .......... 297/188.18, 188.14, 188.21; 181/177, 181/192, 175
See application file for complete search history.

(56) References Cited

U.S. PATENT DOCUMENTS

| | | | |
|---|---|---|---|
| 3,233,940 A | 2/1966 | Tooley, Jr. | |
| D338,791 S | 8/1993 | Cohen | |
| D376,060 S | 12/1996 | Cohen | |
| 5,651,523 A * | 7/1997 | Bridges .................. | B60N 3/103 206/549 |
| 6,092,776 A * | 7/2000 | You ........................ | B60N 3/103 108/44 |
| 6,929,304 B1 * | 8/2005 | Dry .......................... | A47C 7/72 224/539 |
| 7,249,799 B2 | 7/2007 | Luce | |

(Continued)

*Primary Examiner* — Mark R Wendell
(74) *Attorney, Agent, or Firm* — LaMorte & Associates P.C.

(57) ABSTRACT

An armrest assembly for use on a folding chair. The armrest assembly has a molded plastic body with a top surface and an underside. The armrest assembly is provided with a phone holder construct that amplifies sounds produced by a cell phone. An access opening is formed in the top surface of the armrest. A receptacle for holding the cell phone is positioned under the access opening. The receptacle has a base that is smaller than the access opening. Side walls extend from the access opening to the base, therein creating a tapered construct capable of amplifying sounds generated within the receptacle by the cell phone. Protrusions are formed on the base of the receptacle. The protrusions support the cell phone in the receptacle and prevent the speakers of the cell phone from becoming muffled by directly contacting the base within the receptacle.

17 Claims, 5 Drawing Sheets

(56) References Cited

U.S. PATENT DOCUMENTS

| | | | |
|---|---|---|---|
| 8,091,962 B2 | 1/2012 | Quinn | |
| 8,522,917 B1 | 9/2013 | Oh et al. | |
| D696,657 S | 12/2013 | Cohen | |
| 8,789,884 B1 | 7/2014 | Edelman et al. | |
| 8,864,221 B1 * | 10/2014 | Delvilla | A47C 7/62 |
| | | | 297/180.11 |
| 9,808,091 B1 * | 11/2017 | Goldszer | A47C 11/00 |
| 9,809,161 B1 * | 11/2017 | Salter | G02B 27/425 |
| 9,874,902 B2 * | 1/2018 | McCracken | G06F 1/1632 |
| 2003/0128840 A1 * | 7/2003 | Luginbill | B60R 11/0241 |
| | | | 379/455 |
| 2009/0021058 A1 * | 1/2009 | Rajack | A47C 7/68 |
| | | | 297/188.18 |
| 2011/0025105 A1 * | 2/2011 | Henke | B60N 3/101 |
| | | | 297/188.14 |
| 2012/0074741 A1 * | 3/2012 | Andersson | B60N 3/101 |
| | | | 297/188.14 |
| 2015/0208810 A1 | 7/2015 | Kim | |
| 2017/0118554 A1 * | 4/2017 | Morin | H04R 1/345 |
| 2017/0318974 A1 * | 11/2017 | Bergin | A47C 1/12 |
| 2018/0063613 A1 * | 3/2018 | Cohen | H04R 1/028 |
| 2018/0084917 A1 * | 3/2018 | Weirun | A47C 7/62 |

* cited by examiner

FOLDING CHAIR ARMREST WITH ACOUSTIC ENHANCING CELL PHONE HOLDER

BACKGROUND OF THE INVENTION

1. Field of the Invention

In general, the present invention relates to the structure of the armrests that are used on folding chairs, collapsible chairs, camp chairs, beach chairs and other portable lightweight chairs. More particularly, the present invention relates to armrests that are specifically designed with features that to support the presence and operation of a cell phone or similar handheld electronic device.

2. Prior Art Description

There exist many different styles and models of collapsible chairs that are intended to be carried by a user. In addition to be being foldable or collapsible, such chairs are made to be as lightweight as possible while still being functionally sound. In this manner, the chair is not burdensome to carry. Such chairs are often brought to the beach, to tailgates, to concerts and to other such locations that require a chair to be carried a significant distance.

In order to make a chair lightweight, a folding chair is typically manufactured with minimalistic armrests. Often the armrests are little more than strips of fabric or thin moldings of lightweight plastic. The armrests are strong enough to support the weight of an arm, however, the armrests have little integrity to serve any other purpose. Auxiliary items, such as cup holders and cell phone pockets are simply attached to some point along the periphery of the armrests.

Portable folding chairs are often used at the beach, sporting events, and other outside activities where there is typically a high degree of ambient noise. As such, if any person where to place their cell phone in a holding pocket provided on the portable folding chair, it is commonly quite difficult to hear the cell phone. Cell phones have very small speakers that are typically positioned on the edge of the cell phone. When placed in a pocket on a folding chair, these speakers do no face toward the person sitting in the chair. Consequently, when the cell phone rings, or is used to play music, the sounds are difficult to hear without the aid of auxiliary headphones.

In the prior art, designs have been created for cell phone holders that amplify the sounds broadcast by the cell phone. Such prior art is exemplified by U.S. Pat. No. 8,522,917 to Oh, entitled Cell Phone Sound Amplifying Extend Cup. Such prior art structures typically require the use of an amplifying horn waveguide or some similar conical waveguide structure that can mechanically amplify the sounds being created. The use of a conical waveguide requires a space large enough to embody the conical waveguide and enough material to construct the conical waveguide. Neither of these features are present on the minimalistic armrest of a portable collapsible chair.

There are many models and styles of portable chairs. There are also a great many models and styles of cell phone holders. Accordingly, there have undoubtedly been instances where a cell phone holder has been mounted to the armrest of a portable chair as a matter of convenience. However, the cell phone holder does nothing more than hold the cell phone, at best. At worst the cell phone holder creates a baffle around the cell phone that further attenuates any sounds that may emanate from the cell phone. This makes the sounds generated by a cell phone even more difficult to hear.

A need therefore exists for an armrest for a lightweight folding chair that is specifically designed to contain a cell phone holder, wherein the cell phone holder has a physical configuration that can both be formed into a lightweight armrest and act to increase the volume of any sounds produced by the cell phone. These needs are met by the present invention as described and claimed below.

SUMMARY OF THE INVENTION

The present invention is an armrest assembly for use on a lightweight folding chair or collapsible chair. The armrest assembly has a molded plastic body with a top surface upon which a person's arm rests. The molded plastic body has an underside that is reinforced by support ribs for strength. The armrest assembly is provided with a phone holder construct that amplifies sounds produced by a cell phone.

An access opening is formed in the top surface of the armrest's body through which the cell phone can pass. A receptacle for holding the cell phone coupled to the armrest's body, wherein the receptacle is accessed through the access opening. The receptacle has a base that is smaller than the access opening. Side walls extend from the access opening to the base, therein creating a tapered construct capable of amplifying sounds generated within the receptacle by the cell phone. In addition, the base of the receptacle is convex in order to amplify sounds that reflect off the base.

Protrusions are formed on the base of the receptacle. The protrusions extend into the receptacle from the base. The protrusions support the cell phone in the receptacle and prevent the speakers of the cell phone from becoming muffled by directly contacting the base within the receptacle.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention armrest assembly can be adapted for use in many styles and models of folding chairs, the armrest assembly is shown in only one examples. The exemplary embodiment is selected in order to set forth one of the best modes contemplated for the invention. The illustrated embodiments, however, are merely exemplary and should not be considered limitations when interpreting the scope of the appended claims.

Figure 1:
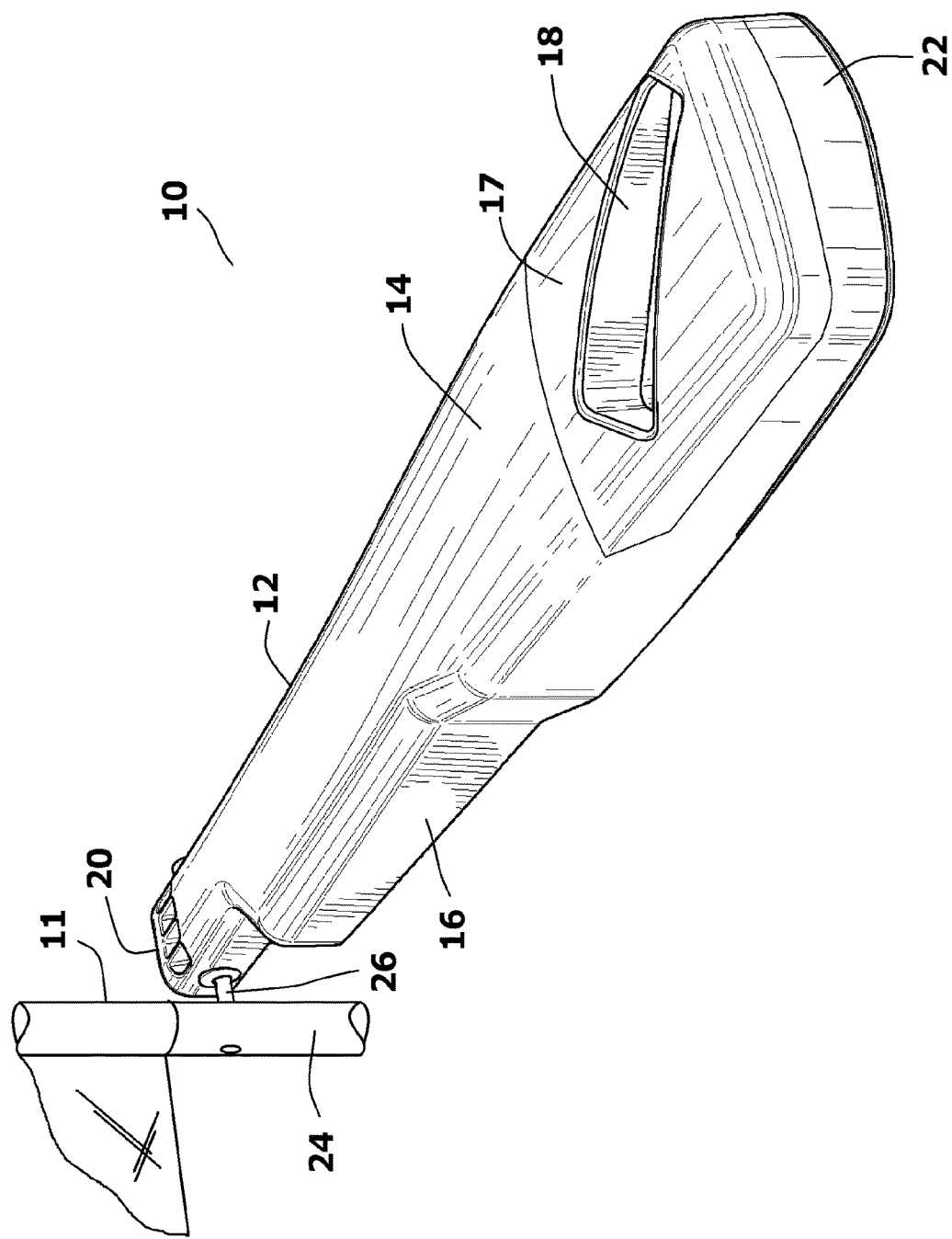
FIG. 1 is a perspective view of an exemplary embodiment of an armrest assembly with phone holder construct.
Figure 2:
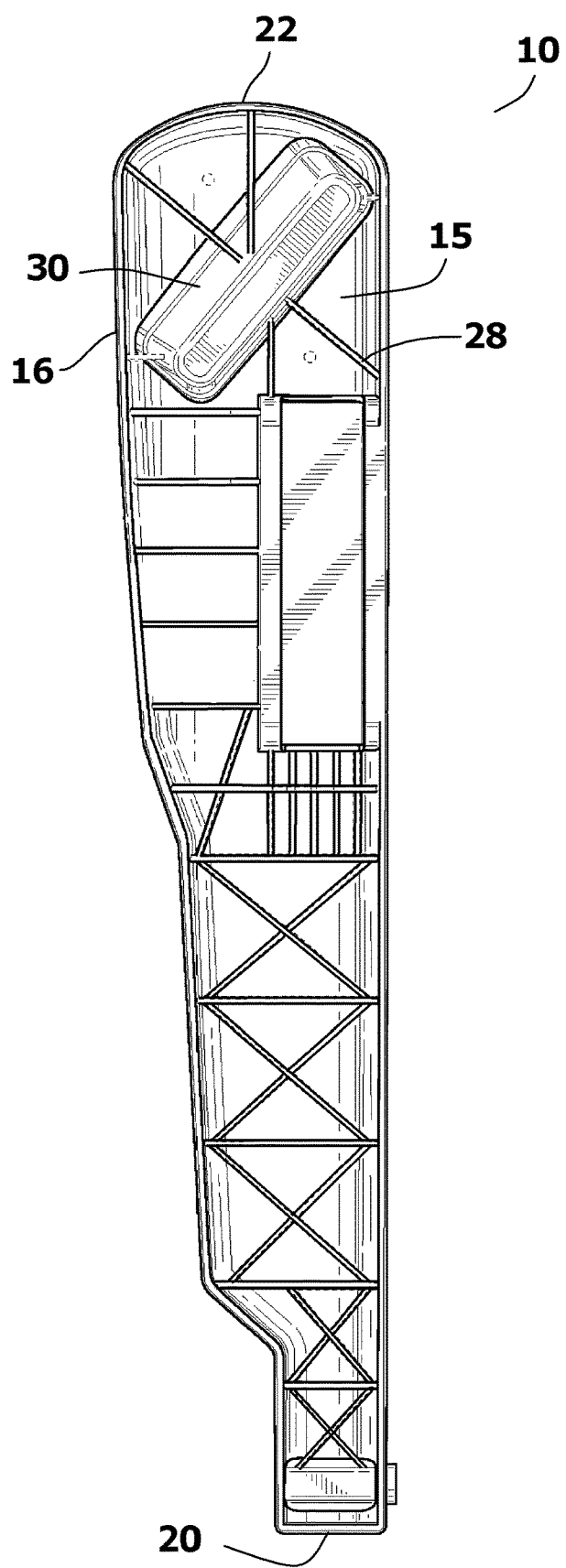
FIG. 2 is a bottom view of the exemplary embodiment of the armrest assembly shown with the phone holder construct.
Figure 3:
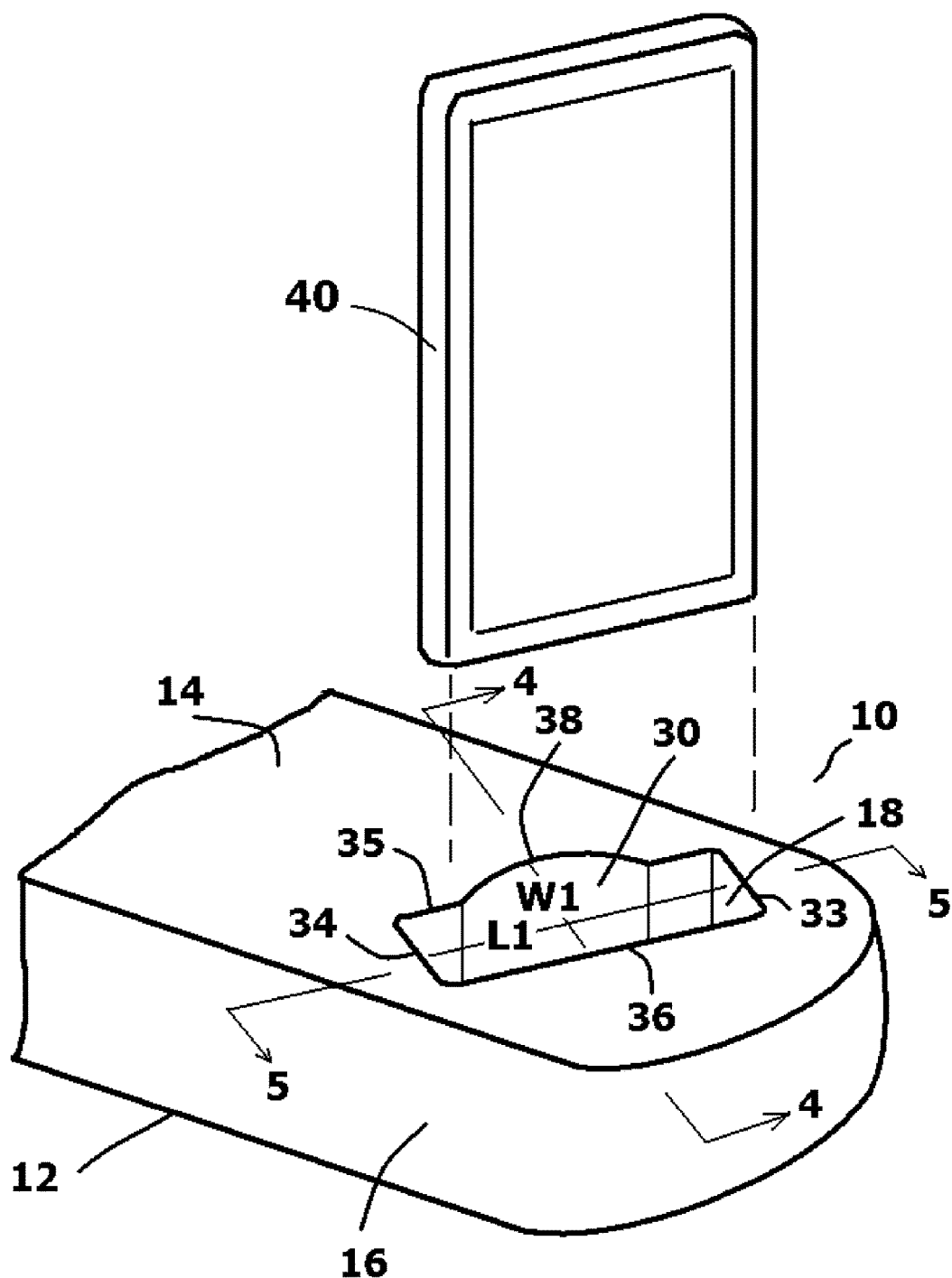
FIG. 3 is an enlarged view of the phone holder construct.

Referring to FIG. 1 in conjunction with FIG. 2 and FIG. 3, an armrest assembly 10 is shown that can be used on a folding chair 11. The armrest assembly 10 includes a molded plastic body 12. The plastic body 12 has a generally planar top surface 14 and a peripheral side wall 16 that extends downwardly from the edges of the top surface 14. When positioned in an unfolded chair, the top surface 14 of the plastic body 12 is generally positioned in a horizontal and the surfaces of the side wall 16 are generally oriented in the vertical. In use, a person's arm and/or hand rest upon the top surface 14 of the plastic body 12. The top surface 14 is generally smooth with the exception of the entrance to a phone holder construct 18 being accessible from the top surface 14. The top surface 14 may be molded from a same plastic as the plastic body 12. However, in the shown embodiment, the top surface has an overmolded section 17. The overmolded section 17 is made of a softer elastomeric material that is molded onto the plastic body 12. This provides a softer surface that is easier to grip and is more comfortable to rest upon than the material of the plastic body 12.

The plastic body 12 of the armrest assembly 10 has a first end 20 and an opposite second end 22. The first end 20 of the plastic body 12 attaches to the backrest framing 24 of the folding chair 11 at a pivot joint 26. The plastic body 12 of the armrest assembly 10 is not solid within the confines of the side wall 16. Rather, the plastic body 12 is mostly hollow. Consequently, the plastic body 12 of the armrest 10 does not have a bottom surface. Rather, below the top surface 14 is a complex underside 15. The underside 15 is a structure with a series of molded reinforcement ribs 28 within the confines of the side wall 16. That is, none of the reinforcement ribs 28 extends beyond the height of the side wall 16. The reinforcement ribs 28 provides structural integrity and strength to the plastic body 12.

Figure 4:
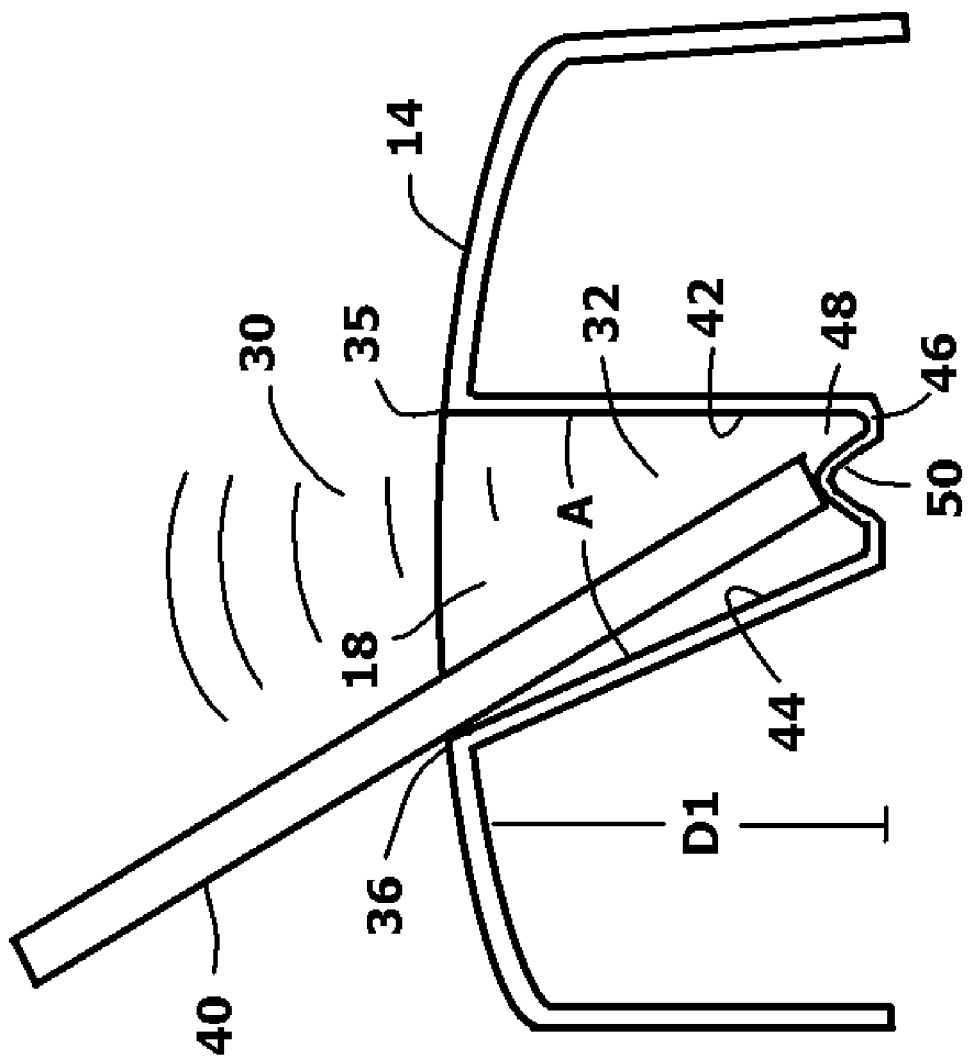
FIG. 4 is a cross-sectional view of the exemplary embodiment of FIG. 3 viewed along section line 4-4 and shown in conjunction with a cell phone.

Referring to FIG. 3 and FIG. 4, it can be seen that a phone holder construct 18 is provided within the armrest assembly 10. The phone holder construct 18 includes a receptacle 30 that can be either molded as part of the plastic body 12 or molded separately and attached to the plastic body 12. The receptacle 30 descends below the top surface 14 of the molded plastic body 12 to a depth D1. The depth D1 is no greater than the height of the peripheral side wall 16. Consequently, the receptacle 30 cannot be observed extending beyond the peripheral side wall 16.

The receptacle 30 of the phone holder construct 18 is accessible through an opening 32 in the top surface 14 of the plastic body 12. The access opening 32 is generally rectangular, having a width W1 between two short sides 33, 34 and a length L1 between two long sides 35, 36. The length L1 and width W1 of the opening are sufficient to enable a cell phone 40 or similar handheld electronic device to pass into the receptacle 30. A concavity 38 is formed in one or both of the long sides 35, 36. The concavity 38 ensures that a gap will always be present adjacent the cell phone 40 that cannot be obstructed by the cell phone 40.

The first long side 35 of the access opening 32 is in-line with a first wall 42 of the receptacle 30. The first wall 42 of the receptacle 30 is oriented in the vertical or within 5 degrees of vertical when the armrest assembly 10 is fully extended. The opposite second long edge 36 is in-line with a second wall 44 of the receptacle 30. The second wall 44 of the receptacle 30 is oriented at an acute angle relative to the vertical. The second wall 44 is angled to cause the cell phone 40 to lean in one direction within the receptacle 30. Together, the first wall 42 and the second wall 44 are separated by a divergence angle A, which is between 25 degrees and 55 degrees. This provides the receptacle 30 with walls that diverge as they approach the access opening 32 of the phone holder construct 18. The diverging side walls 42, 44 create a diverging acoustical waveguide, in the same manner as a megaphone or instrument horn.

The receptacle 30 has a base 46 that extends between the first side wall 42 and the second side wall 44 at the bottom of the receptacle 30. The base 46 is smaller than the access opening 32. However, the base 46 has a length and width that is at least as large as the profile of the cell phone 40 so that the cell phone 40 can fully advance into the receptacle 30. When the cell phone 40 is advanced into the receptacle 30, it does not contact the base 46. To prevent the cell phone 40 from being muffled by the base 46, protrusions 48 are formed along the base that extend upwardly into the receptacle 30. When a cell phone 40 is inserted into the receptacle 30, gravity moves the cell phone 40 down into the receptacle 30 until the cell phone 40 contacts the protrusions 48 extending upwardly from the base 46. The protrusions 48 hold the cell phone 40 at a slight elevation within the receptacle 30, therein ensuring that there is a gap space 50 between the cell phone and the base 46 of the receptacle 30.

When the cell phone 40 is placed into the receptacle 30, the cell phone 40 is placed with its edge speakers facing into the receptacle 30. As audio signals are played by the cell phone 40, those audio signals are directed into the gap space 50 at the bottom of the receptacle 30. The audio signals reflect from the base 46 of the receptacle and are directed toward the top opening 32 of the receptacle 30. As the audio signals propagate toward the top opening 32 of the receptacle 30, those audio signals experience the acoustic waveguide effects created by the diverging side walls 42, 44. The result is that the audio signals are amplified as they propagate through the receptacle 30. The result being that the audio signals are louder exiting the receptacle 30 than they would have been if not channeled into the receptacle 30.

Figure 5:
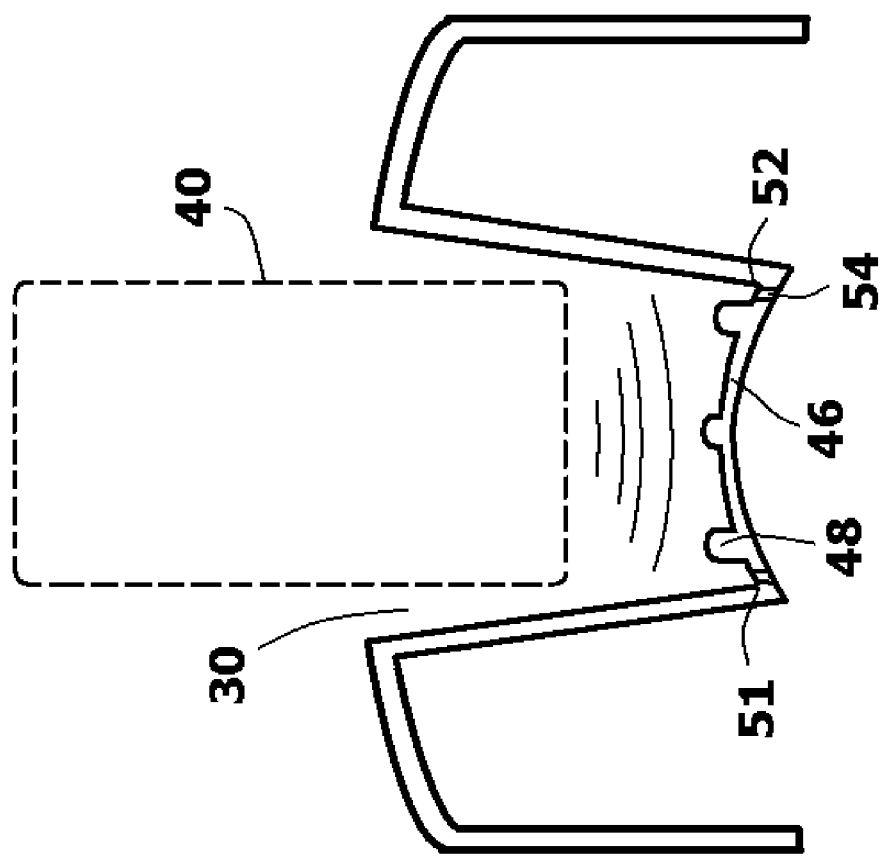
FIG. 5 is a cross-sectional view of the exemplary embodiment of FIG. 3 viewed along section line 5-5.

Referring to FIG. 5 in conjunction with FIG. 4, it will be understood that the acoustical properties of the receptacle 30 are further increased by the configuration of the base 46. The base 46 has a convex shape between a first end 51 and an opposite second end 52. The protrusions 48 extend upwardly from the base 46. The protrusions 48 all terminate at the same elevation in order to support the cell phone 40 in a level manner. Accordingly, the various protrusions 48 have different heights to compensate for the convex curvature of the base 46.

When the cell phone 40 is placed in the receptacle 30, the speakers of the cell phone 40 face the convex base 46. The convex curvature of the base 46 acts to amplify and sounds that reflect off the base 46. Those amplified reflections then propagate out if the receptacle 30, where they are further amplified by the other acoustical properties of the receptacle 30.

Optional openings 54 may be formed at both ends of the base 46. The openings 54 enable water to pass out of the receptacle 30 and not pool within the receptacle 30. The openings 54 also enable some sound signals to pass through the base 46 of the receptacle 30, therein enabling the sound to propagate in a second direction.

With the volume of the cell phone 40 increased by the acoustical properties of the receptacle 30, a person sitting in the chair is more likely to hear the cell phone 30 should it ring, buzz, or be playing music.

The amplification of the audio signals is created by the physical configuration of the phone holder construct 18. No electronics are utilized. Furthermore, the receptacle 30 of the phone holder construct 18 can be integrally molded into the body of the armrest assembly 10. The plastic material utilized to form the receptacle 30 is generally even to the plastic of the reinforcement ribs that would otherwise occupy the same space. Accordingly, the addition of the phone holder construct 18 does not increase the weight or unit cost of the overall armrest assembly.

It will be understood that the embodiment of the present invention that is illustrated and described is merely exemplary and that a person skilled in the art can make many variations to that embodiment. For instance, the present invention can be adapted to most any plastic armrest used on folding or collapsible chairs. All such embodiments are intended to be included within the scope of the present invention as defined by the claims.

What is claimed is:

1. An armrest assembly for a folding chair, comprising:
   a molded armrest body having a top surface, wherein said top surface has an underside reinforced by support ribs;
   a phone holder construct integrally molded as part of said armrest body for receiving a cell phone therein, said phone holder construct having an access opening on said top surface of said armrest body that leads into a receptacle on said underside of said armrest body, said receptacle having a base, a first wall that extends from said access opening to said base, and a second wall that extends from said access opening to said base, wherein said first wall is within five degrees of vertical and said second wall is inclined relative said first wall by an acute angle between twenty five degrees and fifty five degrees, therein causing said first wall and said second wall to diverge from said base toward said access opening; and
   protrusions that extend into said receptacle from said base, wherein said cell phone rests upon said protrusions when in said receptacle and create a gap space between said cell phone and said base.

2. The assembly according to claim 1, wherein said base of said receptacle presents a convex surface to said receptacle.

3. The assembly according to claim 1, wherein said access opening has two long edges and two short edges, wherein said first wall and said second wall terminate at said access opening along said two long edges, respectively.

4. The assembly according to claim 3, wherein at least one of said long edges is formed with a concavity.

5. An armrest assembly for a folding chair, comprising:
   an armrest body having a top surface, wherein an access opening is formed in said top surface;
   a receptacle coupled to said armrest body for holding a cell phone therein, wherein said receptacle is accessed through said access opening, said receptacle having a base that, a first side wall, a second side wall and two short walls that separate said first wall from said second wall, wherein said base is smaller than said access opening, wherein said first side wall extends from said access opening to said base, and said second side wall that extends from said access opening to said base, wherein said second wall is inclined relative said first wall by an acute angle, therein causing said first wall and said second wall to diverge from said base toward said access opening, therein creating a tapered construct capable of amplifying sounds generated by said cell phone within said receptacle; and
   at least one structure within said receptacle wherein said cell phone rests upon said protrusions within said receptacle and creates a gap space between said cell phone and said base.

6. The assembly according to claim 5, wherein said receptacle is integrally molded as part of said armrest body.

7. The assembly according to claim 5, wherein said top surface has a periphery and a peripheral wall extends from said periphery, wherein said peripheral wall has a first height.

8. The assembly according to claim 7, wherein said receptacle extends from said top surface of said armrest body by a distance no greater than said first height of said peripheral wall, therein preventing said receptacle from extending beyond said peripheral wall.

9. The assembly according to claim 5, wherein said acute angle is between 25 degrees and 55 degrees.

10. The assembly according to claim 9, wherein said base of said receptacle presents a convex surface to said receptacle.

11. The assembly according to claim 5, wherein said access opening has two long edges and two short edges, wherein said first wall and said second wall terminate at said access opening along said two long edges, respectively.

12. The assembly according to claim 11, wherein at least one of said long edges is formed with a concavity.

13. An armrest assembly for a folding chair that amplifies sounds produced by a cell phone, said assembly comprising:
    an armrest body having a top surface, wherein an access opening is formed in said top surface through which said cell phone can pass;
    a receptacle for holding said cell phone coupled to said armrest body, wherein said receptacle is accessed through said access opening, said receptacle having a base that is smaller than said access opening a first side wall that extends from said access opening to said base, and a separate second side wall that extends from said access opening to said base, wherein said second wall is inclined relative said first wall at an acute angle, causing said first wall and said second wall to diverge from said base toward said access opening, therein creating a tapered construct capable of amplifying sounds generated within said receptacle by said cell phone; and
    protrusions extending into said receptacle from said base, wherein said protrusions support said cell phone in said receptacle and prevent said cell phone from directly contacting said base within said receptacle.

14. The assembly according to claim 13, wherein said receptacle is integrally molded as part of said armrest body.

15. The assembly according to claim 13, wherein said top surface has a periphery and a peripheral wall extends from said periphery, wherein said peripheral wall has a first height.

16. The assembly according to claim 15, wherein said receptacle extends from said top surface of said armrest body by a distance no greater than said first height of said peripheral wall, therein preventing said receptacle from extending beyond said peripheral wall.

17. The assembly according to claim 13, wherein said base of said receptacle presents a convex surface to said receptacle.

* * * * *